United States Patent [19]
Ishii et al.

[11] Patent Number: 6,140,296
[45] Date of Patent: Oct. 31, 2000

[54] ETHOXYLATE AND PROPOXYLATED HIGHER ALCOHOL SURFACTANT IN HIGH CONCENTRATIONS IN AN AQUEOUS COMPOSITION

[75] Inventors: Yasuo Ishii; Hiroki Sawada; Atsuhito Mori, all of Wakayama, Japan

[73] Assignee: Kao Corporation, Tokyo, Japan

[21] Appl. No.: 09/117,173

[22] PCT Filed: Dec. 2, 1997

[86] PCT No.: PCT/JP97/04391

§ 371 Date: Jul. 28, 1998

§ 102(e) Date: Jul. 28, 1998

[87] PCT Pub. No.: WO98/24864

PCT Pub. Date: Jun. 11, 1998

[30] Foreign Application Priority Data

Dec. 2, 1996 [JP] Japan ................................ 8-321269

[51] Int. Cl.⁷ .............................. C11D 1/722; C11D 1/72
[52] U.S. Cl. ..................... 510/360; 510/421; 510/506; 510/535; 568/625
[58] Field of Search ..................... 510/360, 421, 510/506, 535; 568/625

[56] References Cited

U.S. PATENT DOCUMENTS

| | | | |
|---|---|---|---|
| 3,504,041 | 3/1970 | Weipert et al. | 568/625 |
| 3,567,784 | 3/1971 | Tsatsos et al. . | |
| 3,752,857 | 8/1973 | Milligan | 568/625 |
| 4,115,457 | 9/1978 | Wiedemann | 568/625 |
| 4,134,854 | 1/1979 | Milligan . | |
| 4,624,803 | 11/1986 | Balzer et al. | 510/219 |
| 4,745,230 | 5/1988 | Otten et al. | 568/621 |

FOREIGN PATENT DOCUMENTS

| | | |
|---|---|---|
| 47-788 | 1/1972 | Japan . |
| 47-9561 | 5/1972 | Japan . |
| 53-113805 | 10/1978 | Japan . |
| 60-12000 | 3/1985 | Japan . |
| 6-116587 | 4/1994 | Japan . |
| 6-303825 | 11/1994 | Japan . |
| 1371770 | 10/1974 | United Kingdom . |
| 1601652 | 11/1981 | United Kingdom . |

OTHER PUBLICATIONS

Journal of the American Oil Chemist's Society, vol. 63, No. 9, Surfactants & Detergents, (Sep. 1986), "Nonionic Surfactant Containing Propylene Oxide".

Nonionic Surfactants Physical Chemistry, (1987), Martin J. Schicks.

*Primary Examiner*—Necholus Ogden
*Assistant Examiner*—Christine Ingersoll
*Attorney, Agent, or Firm*—Oblon, Spivak, McClelland, Maier & Neustadt, P.C.

[57] ABSTRACT

A surfactant composition defoaming rapidly, having high detergency and being excellent in handleability in a high-concentration region is provided, which comprises a compound (1) having an average molecular weight of 1,200 or less and water, with the proportion of the compound (1) to the sum total of the compound (1) and water being 50 wt. % or above and with the viscosity of the composition at 25° C. being 1,000 cP or less.

$$RO\text{-}(EO)_x\text{-}(PO)_y\text{-}(EO)_{x'}\text{-}H \qquad (1)$$

wherein R represents $C_{12}$–$C_{15}$ alkyl or the like; EO represents oxyethylene; PO represents oxypropylene; x and x' are each 1 or above; and y ranges from 0.5 to 6.0, provided $(EO)_x$, $(PO)_y$ and $(EO)_{x'}$ are bonded to each other block in this order.

2 Claims, No Drawings

ETHOXYLATE AND PROPOXYLATED HIGHER ALCOHOL SURFACTANT IN HIGH CONCENTRATIONS IN AN AQUEOUS COMPOSITION

TECHNICAL FIELD

The present invention relates to a surfactant composition, more specifically a surfactant composition useful as household and industrial detergents which comprises a specific nonionic surfactant and which can defoam rapidly, has high detergency, and is excellent in handleability in a high-concentration region.

BACKGROUND ART

Polyoxyethylene-base nonionic compounds have been known for long to be useful as surfactant and detergent, and their physical properties and emulsifying, solubilizing and cleansing characteristics have been studied and reported in fair detail (see Martin J. Schick, NONIONIC SURFACTANTS, PHYSICAL CHEMISTRY (1987) and so on).

Such polyoxyethylene-base nonionic surfactants have high detergency and can also be used favorably in a state combined with other ionic surfactant, so that various combinations thereof with other surfactants have been proposed.

However, the polyoxyethylene-base nonionic surfactants according to the prior art have the property of bringing about high foaming and slow defoaming, and this property is unsuitable for use in automatic dish washers, the demand for which has recently increased, use as industrial detergents and use in drum washing machines. Under such circumstances, it has been expected to develop a nonionic surfactant which has high detergency suitable for the above uses and exhibits both low foaming properties and rapid defoaming properties. In order to satisfy these requirements, there have been reported nonionic surfactants wherein low foaming properties are attained by combining ethylene oxide with other alkylene oxides. For example, ethylene oxide/propylene oxide block adducts are proposed in JP-B 60-12000, and block adducts having narrow ranges of distribution of polymerization are proposed in JP-A 6-303825. Further, surfactants wherein the terminal hydroxyl group is blocked with an alkyl group are proposed in JP-A 47-788. However, blocking the terminal of such a surfactant with propylene oxide or a short-chain alkyl group causes the problem of lowering the detergency of the surfactant remarkably, though it is effective in depressing the foaming properties.

With respect to household and industrial detergents, meanwhile, a formulation having a higher surfactant concentration has been required from the standpoints of energy saving in the production or transportation, resource nursing, and diminution in the containers to be disposed of.

When the content of a nonionic surfactant in a detergent lies in a higher range, however, the viscosity of the detergent is sharply increased or decreased even by a little difference in the surfactant content. Therefore, there occur such problems that an extremely high-accuracy metering is required in order to keep the properties of the detergent constant and that it is difficult to keep the detergent at a constant viscosity in storage. Under these circumstances, it has been expected to develop a surfactant composition which contains a nonionic surfactant and which exhibits low foaming properties and rapid defoaming properties and has high detergency and a low and stable viscosity.

U.S. Pat. No. 4134854 discloses a specific polyalkylene oxide adduct as a low-melting nonionic surfactant. However, this US Patent Specification is silent on the favorable concentration of the surfactant composition containing this adduct. U.S. Pat. No. 3,567,784 discloses that another specific polyalkylene oxide adduct is a nonionic surfactant having a high cloud point and a low gelation temperature. However, this US Patent Specification is silent on the high-concentration surfactant composition containing this adduct, so that the viscosity behavior of the composition cannot be inferred. Furthermore, JP-A 47-9561 (corresponding to U.S. Pat. No. 4115457) discloses a process for the preparation of another specific polyalkylene oxide adduct which is useful as a scouring agent or dyeing aid. J.A.O.C.S,vol.63,No.9,pp 1201–1208(1986) discloses similar polyalkylene oxide adducts as above.

DISCLOSURE OF INVENTION

An object of the present invention is to provide a surfactant composition which can defoam rapidly, has high detergency, is excellent in handleability in a high-concentration region, does not need any special operation in the formulating, and can easily be mixed with other auxiliary components or the like.

The inventors of the present invention have intensively studied for the purpose of making up for the deficiencies in the performance of the above polyoxyethylene-base nonionic surfactants to develop a surfactant composition having more excellent performance. As a result, they have found that a surfactant composition which can defoam rapidly, has high detergency, is excellent in handleability in a high-concentration region, and is excellent in formulation characteristics can be obtained by mixing a polyoxyalkylene-base nonionic surfactant specified in the mode of addition with water at a specific ratio. The present invention has been accomplished on the basis of this finding.

Namely, the present invention provides a surfactant composition comprising a compound represented by the following general formula (1), specified in the number of moles of the alkylene oxide added and the mode of addition and having an average molecular weight of 1,200 or less, and water, characterized in that the proportion of the compound represented by the general formula (1) to the sum total of the compound and water is 50 wt. % or above, with the viscosity thereof at 25° C. being 1,000 cP or less:

$$\text{RO-(EO)}_x\text{-(PO)}_y\text{-(EO)}_{x'}\text{-H} \tag{1}$$

wherein R represents $C_{12}$–$C_{15}$ linear or branched alkyl or alkenyl; EO represents oxyethylene; PO represents oxypropylene; x and x' represent each a mean number of moles of the ethylene oxide added and are each 1 or above; and y represents a mean number of moles of the propylene oxide added and ranges from 0.5 to 6.0, provided $(EO)_x$, $(PO)_y$ and $(EO)_{x'}$ are bonded to each other in block in this order.

The mode for carrying out the present invention will now be described in detail.

In the general formula (1), it is preferable that R has 12 to 14 carbon atoms. In particular, a compound of the general formula (1) wherein R is linear alkyl or alkenyl is desirable because of its high detergency.

The compound represented by the general formula (1) and having an average molecular weight of 1,200 or less to be used in the present invention can be prepared by reacting an alcohol represented by the general formula (4):

$$\text{R-OH} \tag{4}$$

(wherein R is as defined above) with ethylene oxide, with propylene oxide, and then with ethylene oxide to conduct block addition.

The alcohol represented by the above general formula (4) includes $C_{12}$–$C_{15}$ saturated and unsaturated, primary and secondary, linear and branched alcohols. Specific examples thereof include linear alcohols such as lauryl alcohol and myristyl alcohol [e.g., "Kalcohl 2098" and "Kalcohl 4098" (trade names), products of Kao Corporation]; mixed $C_{12}$–$C_{15}$ alcohols [e.g., "Kalcohl 2474" (trade name), a product of Kao Corporation]; branched $C_{12}$–$C_{15}$ alcohols prepared by the oxo method or Ziegler method [such as "Oxocol 1213" and "Tridecanol" (trade names), products of Kyowa Hakko Kogyo Co., Ltd.; "Dobanol 23" and "Dobanol 25" (trade names), products of Mitsubishi Chemical Corp.; and "Neodol 23" and "Neodol 25" (trade names), products of Shell Chemical]; and so on.

The addition reaction of the above alcohol with the alkylene oxides may be conducted by any known alkoxylation method in the presence of a catalyst. The order of addition of the alkylene oxides is essential to the present invention, i.e., the addition reaction with ethylene oxide must be first conducted, following by that with propylene oxide and that with ethylene oxide successively. The catalyst to be used in this alkoxylation may be any of acid catalysts and base catalysts. Further, the catalyst may be one disclosed in JP-A 7-227540 which can give a narrow range of distribution of addition of alkylene oxide, for example, MgO—ZnO, MgO—SnO, MgO—$TiO_2$ or MgO—SbO, or a Mg catalyst disclosed in JP-A 1-164437 which can selectively give a narrow range of distribution of addition of alkylene oxide.

In the compound represented by the general formula (1), the mean numbers of moles of the ethylene oxide added, i.e., x and x' are each 1 or above. It is preferable that the sum of x and x' be 4 to 20, still preferably 6 to 15. When the sum of the mean numbers of moles of the ethylene oxide added, i.e., the sum of x and x' lies within the above range, the resulting compound is easily soluble in water to give a composition having a low viscosity.

On the other hand, the mean number of moles of the propylene oxide added, i.e., y is 0.5 to 6.0. A compound represented by the general formula (1) wherein y is 1.0 to 4.5 is particularly favorable because of its high detergency. When the mean number of moles of the propylene oxide added is less than 0.5, the resulting composition will be poor in handleability owing to a significant change in the viscosity, while when it exceeds 6.0, the resulting composition will be poor in detergency.

The average molecular weight of the compound represented by the general formula (1) is 1,200 or less, preferably 1,000 or less. When the average molecular weight exceeds 1,200, the resulting compound will be poor in detergency, and the composition comprising the compound and water will suffer from a significant viscosity change.

The surfactant composition of the present invention must have a proportion of the compound represented by the general formula (1) to the sum total of the compound and water of 50 wt. % or above and a viscosity of 1000 cP or less as determined at 25° C. When the proportion and the viscosity fall within their respective ranges, the resulting composition will little be changed in the viscosity. In particular, when the contents of the compound represented by the general formula (1) and water satisfy the following relationships (2) and (3), the viscosity change of the composition will be minimized favorably:

$$50 \leq C \leq 90 \quad (2)$$

$$C \geq [10(n-y)-40] \quad (3)$$

[wherein C represents a value represented by the formula;

$$C = \frac{Wa}{Wa + Wb} \times 100$$

(wherein Wa represents a content (wt. %) of the compound represented by the general formula (1) in the composition; and Wb represents a content (wt. %) of water in the composition); n represents a number of carbon atoms of the alkyl or alkenyl represented by R in the general formula (1); and y is as defined above].

Further, it is still preferable that C in the above formula (3) satisfy the relationship: $C \geq [10(n-y)-35]$.

It is preferable that the viscosity of the surfactant composition of the present invention at 25° C. be 300 cP or less even in a high-concentration region, which permits the use of a canned pump or magnetic pump generally used in the transfer of low-viscosity solutions. When the composition has a viscosity ranging from 300 to 1000 cP, the composition will be difficultly transferable by ordinary pumping, so that a special transfer device for high-viscosity fluid will be needed, though the composition will be not so problematic in handling by hand Further, when the composition has a viscosity exceeding 1000 cP, it will be difficult to handle it even by hand, and the transfer thereof in a large amount will involve an enlargement in the device to result in significant disadvantages in the equipment cost.

The surfactant composition of the present invention may further contain other nonionic surfactants, anionic surfactants, cationic surfactants, amphoteric surfactants, chelating agents, fungicides and so on, as far as the effects of the present invention are not impaired thereby. Further, viscosity modifiers such as viscosity builder and viscosity depressant may be added to the surfactant composition in order to regulate the characteristics of the compositions.

Examples of the nonionic surfactant to be optionally added to the surfactant composition of the present invention include amine oxides and polyalkylene glycol alkyl ethers other than those represented by the above general formula (1). Examples of the anionic surfactant to be added thereto include alkanesulfonic acid salts, alkylbenzenesulfonic acid salts, α-olefinsulfonic acid salts, alkylsulfuric acid salts, alkyl ether sulfuric acid salts, α-sulfofatty acid salts and higher fatty acid salts. Those of the cationic surfactant to be added thereto include aliphatic amine salts and quaternary ammonium salts; and those of the amphoteric surfactants to be added thereto include betaines, sulfobetaines and amino acid salts. Those of the chelating agent include sodium ethylene-diaminetetraacetate and sodium nitrilotriacetate; and those of the fungicide include benzalkonium chloride and so on.

The surfactant composition of the present invention can defoam rapidly, has high detergency, is excellent in handleability in a high-concentration region, does not need any special operation in the formulating, and can be easily mixed with various auxiliary components for detergency, being useful for liquid detergents. Particularly, the composition is not only favorably usable as the detergent for kitchen, house, bathroom or clothes, but also industrially useful as the scouring agent for fabrics, the emulsifier for polymerization, the degreasing agent for metals, the detergent for electronic components and so on, dispersant, or solubilizing agent.

The present invention will now be described in more detail by referring to the following Synthesis Examples relating to the preparation of nonionic surfactants and the following Examples relating to the surfactant compositions of the present invention, though the present invention is not limited by them.

The average molecular weight of each nonionic surfactant was determined by the following method.

That is, the hydroxyl number of each nonionic surfactant was determined by neutralization titration according to JIS K 0070, and the average molecular weight thereof was calculated from the hydroxyl number thus determined according to the following formula:

$$\text{av. mol. wt.} = \frac{56108}{\text{hydroxyl no.}}$$

SYNTHESIS EXAMPLE 1

Synthesis of compound represented by the formula:

$C_{12}H_{25}O\text{-}(EO)_5\text{-}(PO)_4\text{-}(EO)_5\text{-}H$

Five hundred grams of lauryl alcohol ("Kalcohl 2098" (trade name), a product of Kao Corporation) and 3.0 g of potassium hydroxide were charged into a 5-1 rotary agitated autoclave equipped with two metering tanks for ethylene oxide and propylene oxide, followed by purging with nitrogen. The contents were heated to 110° C. and dehydrated in a vacuum of 40 Torr for one hour. The resulting contents were heated to 150° C. and 592 g of ethylene oxide was introduced into the autoclave by pressurizing to 3.5 kg/cm². The resulting contents were reacted until the pressure lowered to become constant. Then, the resulting contents were cooled to 120° C., and 624 g of propylene oxide was introduced into the autoclave by pressurizing to 3.5 kg/cm². The resulting contents were reacted until the pressure lowered to become constant. Thereafter, the resulting contents were heated again to 150° C., and 592 g of ethylene oxide was introduced thereinto. The resulting mixture was reacted until the pressure lowered to become constant. After the completion of the reaction, the temperature of the contents was lowered, followed by sampling. About 2.3 kg of the objective polyalkylene glycol lauryl ether was obtained (av. mol. wt.: 860).

SYNTHESIS EXAMPLE 2

Synthesis of compound represented by the formula:

$C_{12}H_{25}O\text{-}(EO)_3\text{-}(PO)_2\text{-}(EO)_3\text{-}H$

The same lauryl alcohol and catalyst as those used in Synthesis Example 1 in the same amounts as those of Synthesis Example 1 were charged into the same autoclave as that used in Synthesis Example 1. The lauryl alcohol was reacted with 355 g of ethylene oxide, with 312 g of propylene oxide, and then with 355 g of ethylene oxide in a similar manner to that employed in Synthesis Example 1. About 1.5 kg of the objective polyalkylene glycol lauryl ether was obtained (av. mol. wt.: 566).

SYNTHESIS EXAMPLE 3

Synthesis of compound represented by the formula:

$(C_{12}H_{25}, C_{14}H_{29})O\text{-}(EO)_5\text{-}(PO)_2\text{-}(EO)_5\text{-}H$ A mixed alcohol comprising lauryl alcohol and myristyl alcohol at a weight ratio of 72.4:27.6 ("Kalcohl2474", (trade name), a product of Kao Corporation) was reacted with 572 g of ethylene oxide, with 302 g of propylene oxide, and then with 572 g of ethylene oxide in a similar manner to that employed in Synthesis Example 1. About 2.0 kg of the objective lauryl/myristyl ether of polyalkylene glycol was obtained (av. mol. wt.: 756).

SYNTHESIS EXAMPLE 4

Synthesis of compound represented by the formula:

$C_{12}H_{25}O\text{-}(EO)_7\text{-}(PO)_4\text{-}(EO)_7\text{-}H$

In a similar manner to that employed in Synthesis Example 1, lauryl alcohol was reacted with 829 g of ethylene oxide, with 625 g of propylene oxide, and then with 829 g of ethylene oxide. About 2.7 kg of the objective polyalkylene glycol lauryl ether was obtained (av. mol. wt.: 1035).

SYNTHESIS EXAMPLE 5

Synthesis of compound represented by the formula:

$C_{12}H_{25}O\text{-}(EO)_5\text{-}(PO)_2\text{-}(EO)_5\text{-}H$

In a similar manner to that employed in Synthesis Example 1, lauryl alcohol was reacted with 592 g of ethylene oxide, with 312 g of propylene oxide, and then with 592 g of ethylene oxide. About 2 kg -of the objective polyalkylene glycol lauryl ether was obtained (av. mol. wt.: 744).

SYNTHESIS EXAMPLE 6

Synthesis of compound represented by the formula:

$C_{10}H_{21}O\text{-}(EO)_2\text{-}(PO)_2\text{-}(EO)_3\text{-}H$ (Comparative Compd.)

In a similar manner to that employed in Synthesis Example 1, decyl alcohol was reacted with 279 g of ethylene oxide, with 368 g of propylene oxide, and then with 418 g of ethylene oxide. About 1.5 kg of the objective polyalkylene glycol decyl ether was obtained (av. mol. wt.: 495).

SYNTHESIS EXAMPLE 7

Synthesis of compound represented by the formula:

$C_{12}H_{25}O\text{-}(EO_{10}/PO_2)\text{-}H$ (Comparative Compd.)

The same lauryl alcohol and catalyst as those used in Synthesis Example 1 in the same amounts as those of Synthesis Example 1 were charged into the same autoclave as that used in Synthesis Example 1. The lauryl alcohol was reacted with a mixture comprising 1184 g of ethylene oxide and 312 g of propylene oxide in a similar manner to that of Synthesis Example 1. About 2.0 kg of the objective polyalkylene glycol lauryl ether was obtained (av. mol. wt.: 743).

SYNTHESIS EXAMPLE 8

Synthesis of compound represented by the formula:

$C_{12}H_{25}O\text{-}(EO)_6\text{-}H$ (Comparative Compd.)

In a similar manner to that employed in Synthesis Example 1, lauryl alcohol was reacted only with 710 g of ethylene oxide. Thus, the objective polyethylene glycol lauryl ether was obtained (av. mol. wt.: 450).

SYNTHESIS EXAMPLE 9

Synthesis of compound represented by the formula:

$C_{12}H_{25}O\text{-}(PO)_4\text{-}(EO)_{10}\text{-}H$ (Comparative Compd.)

In a similar manner to that employed in Synthesis Example 1, lauryl alcohol was reacted with 624 g of propylene oxide, and then with 1184 g of ethylene oxide.

Thus, the objective polyalkylene glycol lauryl ether was obtained (av. mol. wt.: 858).

SYNTHESIS EXAMPLE 10

Synthesis of compound represented by the formula:

$C_{14}H_{29}O\text{-}(EO)_{10}\text{-}(PO)_2\text{-}(EO)_{12}\text{-}H$ (Comparative Compd.)

In a similar manner to that employed in Synthesis Example 1, myristyl alcohol was reacted with 1029 g of ethylene oxide, with 271 g of propylene oxide, and then with 1235 g of ethylene oxide. About 3.0 kg of the objective polyalkylene glycol myristyl ether was obtained (av. mol. wt.: 1300).

EXAMPLES 1 TO 4 AND COMPARATIVE EXAMPLES 1 TO 9

Surfactant compositions were prepared by mixing the nonionic surfactants listed in Table 1 with water in such amounts as to give the C-values specified in Table 1.

The obtained surfactant compositions were examined for handleability, viscosity stability, and defoaming properties by the following methods. The results are given in Table 1.

<Evaluation methods for handleability and viscosity stability>

The surfactant compositions were each examined for viscosity at 25° C. by the use of a type E viscometer (mfd. by Toki Commercial Co., Ltd., VISCONIC-EMD).

With respect to the handleability, the case wherein the viscosity is 300 cP or less is shown by "⊚", the case wherein the viscosity is more than 300 cP but not exceeds 1000 cP is shown by "○", and the case wherein the viscosity exceeds 1000 cP is shown by "×".

Further, the concentration dependence of viscosity (viscosity stability) was evaluated based on the rate of viscosity change ($\Delta\eta$) as defined by the following formula:

rate of viscosity change $$\text{rate of viscosity change } (\Delta\eta) = \frac{|\eta 2 - \eta 1|}{\eta 1} \times 100$$

(wherein $\eta 1$ represents a viscosity at a concentration of C % and 25° C.; $\eta 2$ represents a viscosity at a concentration of (C+1) % and 25° C.; and C is as defined above).

With respect to the viscosity stability, the case wherein the rate of viscosity change is 3 or below is shown by "⊚"; the case wherein the rate is more than 3 but not exceeds 5 is shown by "○"; and the case wherein the rate exceeds 5 is shown by "×".

<Evaluation method for defoaming properties>

According to the testing method as stipulated in JIS K 3362, the defoaming properties of each surfactant composition were evaluated by preparing a 0.1%(in terms of surfactant) aqueous solution of the composition, determining the quantity of foam just after the testing and that after the lapse of 5 minutes, and calculating the rate of defoaming.

With respect to the defoaming properties, the case wherein the ratio of the quantity of foam after the lapse of 5 minutes to that just after the testing is 0 to 0.25 is shown by "⊚"; the case wherein the ratio is more than 0.25 but not exceeds 0.50 is shown by "○"; the case wherein the ratio is more than 0.50 but not exceeds 0.75 is shown by "Δ"; and the case wherein the ratio is more than 0.75 but not exceeds 1.00 is shown by "×".

TABLE 1

| | | Nonionic surfactant RO-(EO)x-(PO)y-(EO)x'-H | | | | | Handleability | | Viscosity stability | | Defoaming properties | | |
|---|---|---|---|---|---|---|---|---|---|---|---|---|---|
| | | R | x | y | x' | C (wt %) | viscosity (cp) | evaluation | rate of viscosity change | evaluation | just after (mm) | after 5 min. (mm) | evaluation |
| Ex. | 1 | n-$C_{12}H_{25}$ | 5 | 4 | 5 | 50 | 191 | ⊚ | 1.3 | ⊚ | 117 | 27 | ⊚ |
| | 2 | n-$C_{12}H_{25}$ | 3 | 2 | 3 | 70 | 115 | ⊚ | 1.7 | ⊚ | 105 | 30 | ○ |
| | 3 | n-$C_{12}H_{25}$, n-$C_{14}H_{29}$ | 5 | 2 | 5 | 70 | 295 | ⊚ | 3.0 | ⊚ | 118 | 27 | ⊚ |
| | 4 | n-$C_{12}H_{25}$ | 7 | 4 | 7 | 70 | 146 | ⊚ | 0.2 | ⊚ | 122 | 26 | ⊚ |
| Comp. Ex. | 1 | n-$C_{12}H_{25}$ | 5 | 2 | 5 | 50 | 9114 | × | 4.9 | ○ | 123 | 37 | ○ |
| | 2 | n-$C_{12}H_{25}$ | 10/2 | * | 0 | 60 | 900 | ○ | 15 | × | 121 | 94 | × |
| | 3 | n-$C_{12}H_{25}$ | 6 | 0 | 0 | 70 | 4698 | × | 4.9 | ○ | 115 | 105 | × |
| | 4 | n-$C_{12}H_{25}$ | 0 | 4 | 10 | 70 | 1946 | × | 4.5 | ○ | 110 | 17 | ⊚ |
| | 5 | sec-$C_{12}H_{25}$, $C_{13}H_{17}$, sec-$C_{14}H_{29}$ | 9 | 0 | 0 | 70 | 1574 | × | 4.2 | ○ | 130 | 43 | ○ |
| | 6 | $C_9H_{19}$-C$_6$H$_4$- | 9 | 0 | 0 | 70 | 6912 | × | 4.8 | ○ | 98 | 64 | Δ |
| | 7 | n-$C_{14}H_{29}$ | 10 | 2 | 12 | 70 | 12632 | × | 5.4 | × | 104 | 13 | ⊚ |
| | 8 | n-$C_{12}H_{25}$ | 5 | 4 | 5 | 45 | 151 | ⊚ | 10.0 | × | 117 | 27 | ⊚ |
| | 9 | n-$C_{10}H_{21}$ | 2 | 2 | 3 | 50 | 64 | ⊚ | 0.2 | ⊚ | 109 | 17 | ⊚ | notes) * addition at random

As apparent from the results given in Table 1, the surfactant compositions of the present invention (Examples 1 to 4) are excellent in handleability, viscosity stability and defoaming properties. On the other hand, the composition having a viscosity lying outside the range of the present invention (Comparative Example 1), the one wherein the ratio of the compound represented by the general formula (1) to the sum total of the compound and water lies outside the range of the present invention (Comparative Example 8), and those containing nonionic surfactants other than the ones according to the present invention (Comparative Examples 2 to 7) are problematic in handleability, viscosity stability and/or defoaming properties.

Further, the composition of Comparative Example 9 is poor in detergency as follows, though it is as excellent as the compositions of the present invention in handleability, viscosity stability defoaming properties.

EXAMPLES 5 TO 8 AND COMPARATIVE EXAMPLES 10 TO 14

Surfactant compositions were prepared by mixing the nonionic surfactants. listed in Table 2 with water in such amounts as to give the C-values specified in Table 2.

The surfactant compositions were examined for detergency by the following method. The results are given in Table 2.

<Evaluation method for detergency>

(1) Preparation of sebum-stained cloth

Two grams of a model sebum comprising the following components was applied on a piece of cotton cloth (10 cm×10 cm) to prepare a sebum-stained cloth (artificially stained cloth).

*model sebum

| | |
|---|---|
| cottonseed oil | 60 wt. % |
| oleic acid | 10 wt. % |
| palmitic acid | 10 wt. % |
| liquid and solid paraffins | 10 wt. % |

(2) Washing conditions and evaluation method

Five sebum-stained cloths (10 cm×10 cm) prepared above (artificially stained cloths) were together washed with 1 l of an aqueous solution of each sample detergent in a Terg-O-Tometer at 1000 rpm. The washing conditions are as follows.

*washing conditions:

| | |
|---|---|
| washing time | 10 min |
| detergent conc. | 0.03 wt. % |
| | (in terms of effective surfactant component) |
| hardness of water | 4° DH |
| temp. of water | 20° C. |
| rinsing | in tap water for 5 min |

The detergency of each surfactant composition was evaluated by examining the nonstained cloth and the stained cloths before and after washing for the reflectance at 550 nm by the use of a self-colorimeter (mfd. by Nippon Denshoku Kogyo, Z-300A) and calculating the rate (%) of cleansing according to the following formula (the values given in Table 2 are each an average of the rates of cleansing found with respect to five cloths).

$$\text{rate of cleansing (\%)} = \frac{\text{Reflectance after washing} - \text{reflectance before washing}}{\text{reflectance of nonstained cloth} - \text{reflectance before washing}} \times 100$$

TABLE 2

| | | Nonionic surfactant RO-(EO)x-(PO)y-(EO)x'-H | | | | C | Rate of cleansing (%) |
|---|---|---|---|---|---|---|---|
| | | R | x | y | x' | (wt %) | |
| Ex. | 5 | n-C$_{12}$H$_{25}$ | 5 | 4 | 5 | 50 | 43 |
| | 6 | n-C$_{12}$H$_{25}$ | 3 | 2 | 3 | 70 | 46 |
| | 7 | n-C$_{12}$H$_{25}$, n-C$_{14}$H$_{29}$ | 5 | 2 | 5 | 70 | 50 |
| | 8 | n-C$_{12}$H$_{25}$ | 7 | 4 | 7 | 70 | 40 |
| Comp. | 10 | n-C$_{12}$H$_{25}$ | 10/2 * | 0 | | 70 | 40 |
| Ex. | 11 | n-C$_{12}$H$_{25}$ | 6 | 0 | 0 | 70 | 47 |
| | 12 | sec-C$_{12}$H$_{25}$, C$_{13}$H$_{27}$, sec-C$_{14}$H$_{29}$ | 9 | 0 | 0 | 70 | 40 |
| | 13 | n-C$_{14}$H$_{29}$ | 10 | 2 | 12 | 70 | 31 |
| | 14 | n-C$_{10}$H$_{21}$ | 2 | 2 | 3 | 50 | 30 | note) * addition at random

As apparent from the results given in Table 2, the surfactant compositions of the present invention (Examples 5 to 8) exhibited high rates of cleansing equivalent or superior to those of Comparative Examples 10 to 14. On the other hand, the compositions comprising nonionic surfactants having average molecular weights lying outside the range of the present invention (Comparative Examples 13 and 14) were poor in detergency.

What is claimed is:

1. A surfactant composition comprising:
   (a) a compound having an average molecular weight of 1,200 or less represented by the formula (I)

$$\text{RO-(EO)}_x\text{-(PO)}_y\text{-(EO)}_{x'}\text{-H} \tag{I}$$

wherein
   R represents $C_{12}$–$C_{15}$ linear or branched alkyl or alkenyl;
   EO represents oxyethylene;
   PO represents oxypropylene;
   x and x' represent each a mean number of moles of the ethylene oxide added and are each 1 or above, wherein the sum of x and x' ranges from 4 to 20;
   y represents a mean number of moles of the propylene oxide added and ranges from 1.0 to 4.0,
   wherein $(EO)_x$, $(PO)_y$ and $(EO)_{x'}$ are bonded to each other in block in this order; and
   (b) water, with the proportion of the compound represented by the formula (I) to the sum total of the compound and water being 50 wt. % or above, with the viscosity thereof at 25° C. being 1,000 cP or less; and
   wherein the contents of the compound represented by the formula (I) and water satisfy the relationships (2) and (3):

$$50 \leq C \leq 90 \tag{2}$$

$$C \geq [10(n-y)-40] \tag{3}$$

wherein C represents a value represented by the formula (5);
   n represents a number of carbon atoms of the alkyl or alkenyl represented by the R in formula (I) and y is as defined above $$C = Wa/(Wa+Wb) \times 100 \tag{5}$$

wherein Wa represents a content (wt.%) of the compound represented by the formula (I) in the composition; and Wb represents a content (wt.%) of water in the composition.

2. A liquid detergent including the composition as set forth in claim 1.

* * * * *